United States Patent
Eck

(10) Patent No.: US 6,508,121 B2
(45) Date of Patent: Jan. 21, 2003

(54) FILLING LEVEL SENSOR

(75) Inventor: Karl Eck, Frankfurt (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/813,403

(22) Filed: Mar. 20, 2001

(65) Prior Publication Data

US 2001/0032507 A1 Oct. 25, 2001

(30) Foreign Application Priority Data

Apr. 19, 2000 (DE) .......................... 100 19 666

(51) Int. Cl.[7] .................. G01F 23/32; G01F 23/76; G01B 21/00; H01G 10/14
(52) U.S. Cl. .................... 73/317; 73/322.5; 338/33; 340/625
(58) Field of Search .................. 73/317, 318, 313, 73/322.5; 340/625; 338/33

(56) References Cited

U.S. PATENT DOCUMENTS

| | | | | |
|---|---|---|---|---|
| 1,902,933 A | * | 3/1933 | Zubaty | 137/560 |
| 3,348,413 A | * | 10/1967 | Zimmerle | 73/313 |
| 3,449,955 A | * | 6/1969 | Stadelmann | 73/313 |
| 3,925,747 A | | 12/1975 | Woodward et al. | |
| 3,968,896 A | * | 7/1976 | Giacoletti et al. | 220/63 R |
| 4,107,998 A | * | 8/1978 | Taylor | 73/313 |
| 4,481,389 A | * | 11/1984 | Johnson | 200/84 C |
| 4,928,526 A | * | 5/1990 | Weaver | 73/313 |
| 4,939,932 A | | 7/1990 | Ritzenthaler et al. | |
| 5,167,156 A | | 12/1992 | Tozawa | |
| 5,272,918 A | * | 12/1993 | Gaston et al. | 73/290 R |
| 5,666,851 A | * | 9/1997 | Bacon | 73/317 |
| 6,000,913 A | * | 12/1999 | Chung et al. | 417/53 |

FOREIGN PATENT DOCUMENTS

| | | | |
|---|---|---|---|
| DE | 3310704 C2 | 3/1989 | G01F 23/36 |
| DE | 4035321 A1 | 5/1991 | G01F 23/26 |
| DE | 4206975 A1 | 9/1992 | B60K 15/00 |
| EP | 0 702 216 A1 | 3/1996 | G01F 23/26 |

* cited by examiner

Primary Examiner—Hezron Williams
Assistant Examiner—Katina Wilson
(74) Attorney, Agent, or Firm—Richard A. Speer; Mayer, Brown, Rowe & Maw

(57) ABSTRACT

A filling level sensor (2) for a fuel container (1) of a motor vehicle has two lever arms (4, 5). One of the lever arms (4) supports a float (10), while the other lever arm (5) is prestressed against the bottom of the fuel container (1). A detecting device (6) for detecting the filling level in the fuel container (1) determines the difference between the positions of the lever arms (4, 5). The detection of the filling level in the fuel container (1) is hereby rendered very accurate.

6 Claims, 2 Drawing Sheets

FILLING LEVEL SENSOR

BACKGROUND OF THE INVENTION

The invention relates to a filling level sensor for a liquid container, in particular a fuel container for a motor vehicle, having a lever arm supporting a float, having a support, provided for fastening in the liquid container, for bearing the lever arm, and having a detecting device for detecting the position of the float.

Such level sensors are used in fuel containers of present day motor vehicles and are known from practice. In order to compensate raising and lowering of the bottom of the fuel container, the support of the known liquid level sensor is fastened on a component, such as a splash part, for example, prestressed against the bottom of the fuel container. The aim of this to ensure that the position of the float corresponds to the filling level in the liquid container.

It is disadvantageous in the known filling level sensor that because of the large spacing between the region prestressed against the bottom and the swiveling region of the float, it is impossible to determine the zero position of the lever arm reliably. In addition, the detection of the zero position of the float is rendered difficult by the fact that the component on which the support is fastened can tilt, or that the angle of inclination of the component holding the support changes upon warping of the bottom. Consequently, the filling level in the liquid container cannot be determined reliably with the aid of known filling level sensor. In particular, present day fuel containers made from plastic can be deformed strongly on thermal expansions and as a function of the filling level.

BRIEF SUMMARY OF THE INVENTION

The invention is based on the problem of configuring a filling level sensor of the type mentioned at the beginning such that it can determine with particular accuracy the filling level in a fuel container, in particular.

According to the invention, this problem is solved by means of a second lever arm, provided for the purpose of prestressing against a bottom of the liquid container in the region of the float, and by a detecting device for determining the position of the second lever arm.

Owing to this configuration, the filling level in the liquid container can be determined with particularly high accuracy by determining the difference between the positions of the lever arms. Since the second lever arm determines the position of the bottom in the region of the float, a slightly tilted arrangement of the support leads only to unimportant falsifications of the filling level determined. The filling level in the fuel container can thereby be detected with particular accuracy. A further advantage of this configuration consists in that the support need no longer be fastened on a component prestressed against the bottom, as in the case of the known liquid level sensor. The support can thereby be fastened directly on the wall of the liquid container. Particularly in the case of fuel containers constructed as a multichamber tank, this leads to a substantial simplification in assembly, since in this case each of the chambers requires a filling level sensor.

The detecting device for the second lever arm could have a potentiometer, for example. Such potentiometers are, however, difficult to protect against the chemical influences of the liquid, and are therefore very vulnerable. However, in accordance with an advantageous development of the invention, electric contacts of the detecting device can simply be encapsulated against the liquid in the liquid container, when the second lever arm is shaped for adjusting at least one magnet and when the detecting device has a magnetic sensor. Passive magnetic position sensors such as are disclosed in DE 196 48 539 A1 could be used, for example, as magnetic sensor. Moreover, however, Hall elements, reed contacts or similar sensors are also conceivable. The sensors have the advantage that they are capable of diagnosis. In addition, for example, reference points can be interrogated or calibrated by an appropriate configuration of an electronic system of the detecting device.

The filling level sensor according to the invention could, for example, have a second detecting device for detecting the deflection of the second lever arm. However, the filling level sensor according to the invention requires only a single detecting device when the detecting device is shaped for determining the difference in the deflections of the lever arms.

In accordance with another advantageous development of the invention, the detecting device for determining the difference between the deflections of the lever arms is of a particularly simple structural configuration when magnets which can be adjusted by the two lever arms are respectively situated opposite one another with opposite polarization, and when the magnetic sensor is arranged between the range of movement of the magnets.

The filling level sensor according to the invention requires particularly few components to be mounted when the second lever arm has a lever wire which is angled off to form a bearing axis of the bearing in the support.

Damage to the bottom of the liquid container by the second lever arm can be avoided in a simple way in accordance with another advantageous development of the invention when the lever wire has a bend in its region provided for bearing against the bottom. The bottom of the liquid container can additionally have a slideway.

Since the liquid container, in particular the fuel container, is frequently a container of complicated shape, the relationship between filling level and filled amount in the container is not linear. The determination of the filled amount with the aid of the filling level sensor according to the invention requires a particularly low outlay when the second lever arm has a cam disk for adjusting the magnet.

In accordance with another advantageous development of the invention, it is easy to ensure that the second lever arm bears reliably against the bottom, and that the magnet bears reliably against the cam disk when the magnet of the second lever arm is prestressed indirectly or directly against the cam disk.

The number of the components of the filling level sensor according to the invention which are to be mounted can be kept particularly low when the magnet of the second lever arm is instructed as a cam disk.

A contribution to further simplifying the design of the filling level sensor according to the invention is made when the support has a flange, which can be inserted in an opening in the fuel container, and in each case guides for the magnets of the lever arms, and a cutout, which is sealed off from the fuel container and serves to hold the magnetic sensor. Furthermore, this contributes to simplifying the mounting of the filling level sensor according to the invention in the liquid container.

The mounting of the filling level sensor according to the invention is particularly simple when the lever wire has a bend in the region of the cam disk, and when the cam disk is clipped to the lever wire.

DESCRIPTION OF THE DRAWINGS

The invention permits numerous embodiments. For the purpose of further explanation of its basic principle, two of these are illustrated in the drawing and described below. In the drawing.

DETAILED DESCRIPTION OF THE INVENTION

Figure 1:
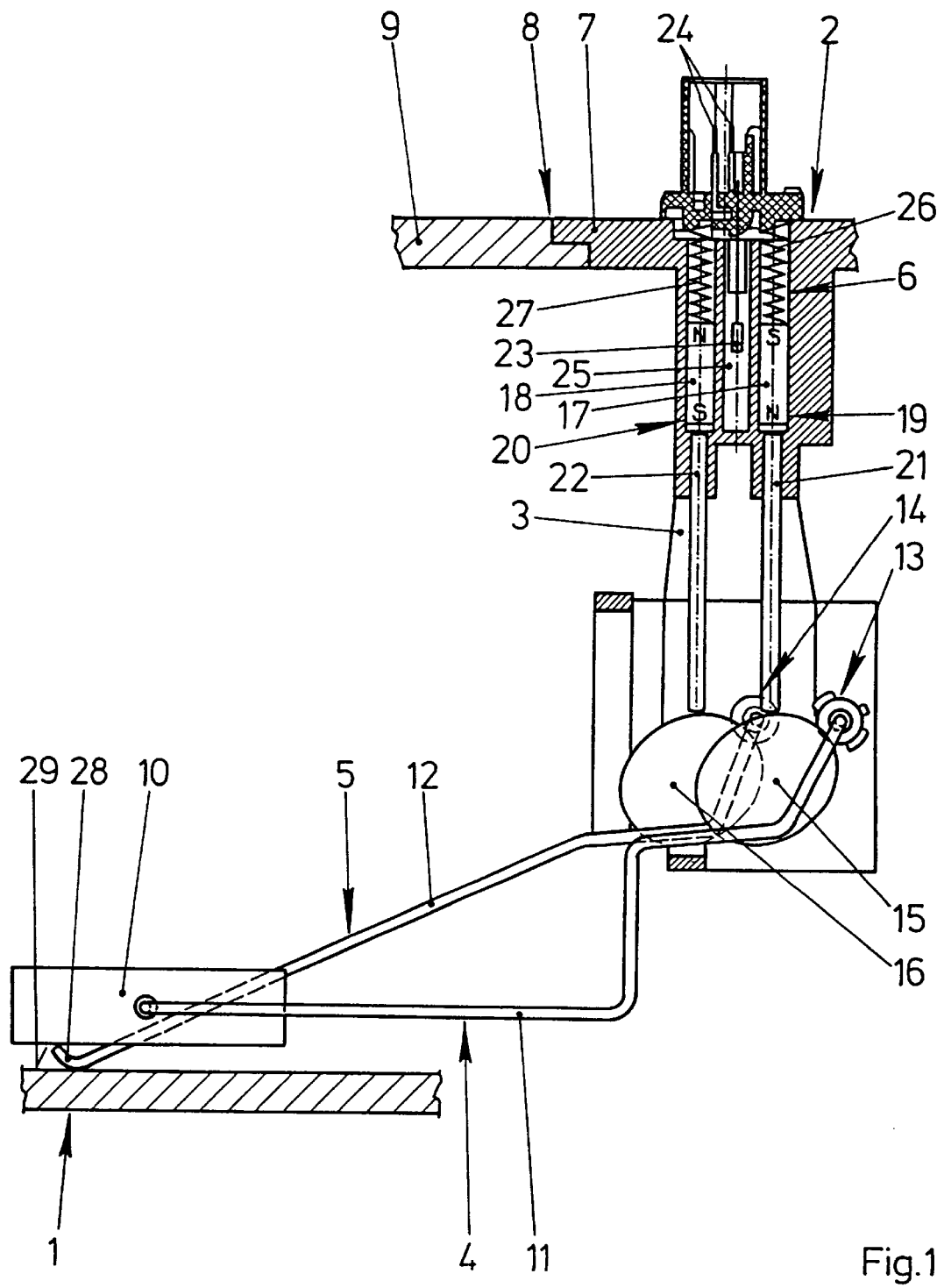
FIG. 1 shows a filling level sensor according to the invention, mounted in a fuel container.

FIG. 1 shows a filling level sensor 2 mounted in a fuel container 1 of a motor vehicle. The filling level sensor 2 has a support 3 for bearing two lever arms 4, 5 and for holding a detecting device 6 for the position of the lever arms 4, 5. A flange 7 of the support 3 is fastened in an opening 8 in a wall 9 of the fuel container 1. One of the lever arms 4 supports a float 10, while the second lever arm 5 is prestressed against the bottom of the fuel container 1. The float 10 follows a fuel level in the fuel container 1. The lever arms 4, 5 each have a lever wire 11, 12, with the aid of which they penetrate into bearings 13, 14 of the support 3. Cam disks 15, 16 are respectively fastened on the lever wires 11, 12. Supported on the cam disks 15, 16 are plungers 21, 22 which displace magnets 17, 18 in guides 19, 20 of the support 3.

The magnets 17, 18 are opposite one another with mutually opposite polarities. The detecting device 6 has a magnetic sensor 23 arranged between the two magnets 17, 18. The magnetic sensor 23 determines the sum of the magnetic field strengths of the magnets 17, 18, and feeds electronic signals to connecting contacts 24 arranged on the outside of the fuel container 1. The electronic signals of the magnetic sensor 23 therefore correspond to the difference between the positions of the lever arms 4, 5 and thus, given appropriate geometrical shaping of the cam disks 15, 16, to the filled amount of fuel in the fuel container 1.

The magnetic sensor 23 is arranged in a cutout 25 encapsulated from the fuel container 1. Springs 26, 27 are arranged inside the guides 19, 20 of the magnets 17, 18. Of course, the magnets 17, 18 can also bear directly, and thus without the interposition of the plungers 21, 22, against the cam disks 15, 16. The lever wire 12 of the second lever arm 5 has a bend 28 in its region bearing against the bottom of the fuel container 1. The bottom has a slideway 29 in this region.

Figure 2:
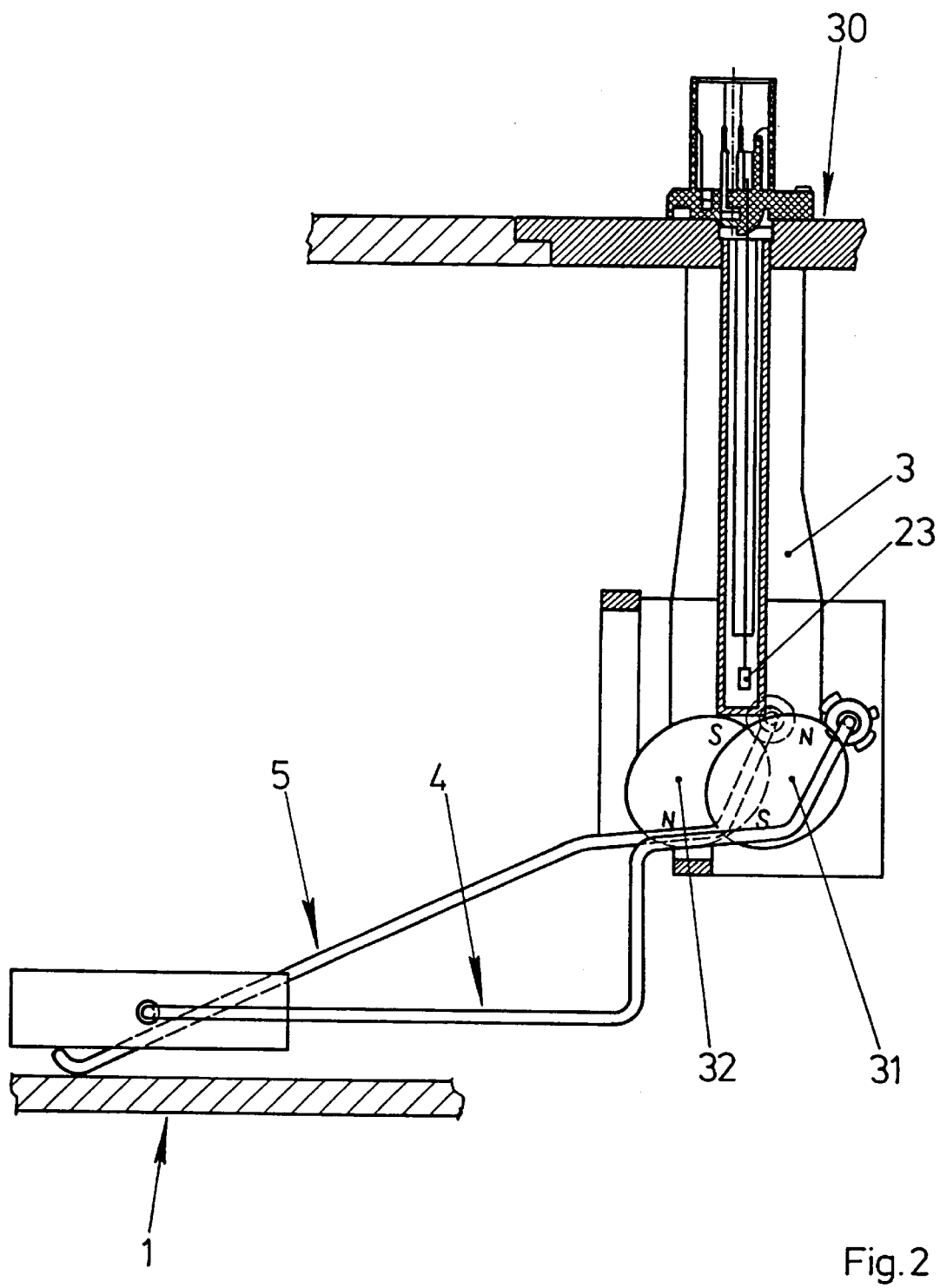
FIG. 2 shows a further embodiment of the filling level sensor according to the invention.

FIG. 2 shows a filling level sensor 30 in a further embodiment. This filling level sensor 30 differs from that in FIG. 1 chiefly in that the lever arms 4, 5 have magnetic cam disks 31, 32. The cam disks 31, 32 have mutually opposite polarities. The magnetic sensor 23 is arranged between the cam disks 31, 32, and determines the sum of the magnetic field strengths, and thus the difference between the positions of the lever arms 4, 5.

What is claimed is:

1. A fluid level sensor for use with an automobile fuel tank comprising:

(a) a first lever arm-pivotally mounted within the fuel tank and having a float element attached to one end thereof to effect rotation of the lever arm by changes in the fluid level;

(b) a second lever arm pivotally mounted within the fuel tank and having one end in contact with the bottom wall of the tank to effect rotation of the lever arm by changes in the position of the bottom wall;

(c) a magnet operably associated with each of the first and second lever arms, the magnets being oriented and positioned with respect to each other to produce a combined magnetic field representative of the level of fuel; and (d) a magnetic field sensor-positioned to sense the combined magnetic field.

2. A fluid level sensor as defined in claim 1 wherein the magnets operably associated with the first and second lever arms are contained within the magnetic field sensor, are insulated from the interior of the tank, and mechanical structure is provided to operably connect the magnets to the lever arms.

3. A fluid level sensor as defined in claim 2 wherein the mechanical structure comprises a cam disk fastened to each lever arm for rotation when the respective lever arm pivots.

4. A fluid level sensor as defined in claim 3 have profiles related to the configuration of the fuel tank.

5. A fluid level sensor as defined in claim 3 wherein the cam discs are magnetic and are mounted with opposing polarities.

6. A fluid level sensor as defined in claim 3 wherein the mechanical structure further includes plungers that operably contact the cam discs at one end and are connected to the magnets at the other end.

\* \* \* \* \*